United States Patent [19]
Furlani et al.

[11] Patent Number: 6,061,166
[45] Date of Patent: May 9, 2000

[54] DIFFRACTIVE LIGHT MODULATOR

[75] Inventors: Edward P. Furlani, Lancaster; Syamal K. Ghosh; Dilip K. Chatterjee, both of Rochester, all of N.Y.

[73] Assignee: Eastman Kodak Company, Rochester, N.Y.

[21] Appl. No.: 09/173,331

[22] Filed: Oct. 15, 1998

[51] Int. Cl.[7] ............................... G02F 1/03; G02B 26/08
[52] U.S. Cl. ..................... 359/254; 359/224; 359/247; 359/263
[58] Field of Search .................................. 359/223, 224, 359/290, 291, 295, 566, 569, 572, 573, 246, 247, 254, 263

[56] References Cited

U.S. PATENT DOCUMENTS

| | | | |
|---|---|---|---|
| 5,311,360 | 5/1994 | Bloom et al. | 359/572 |
| 5,677,783 | 10/1997 | Bloom et al. | 359/224 |
| 5,757,536 | 5/1998 | Ricco et al. | 359/224 |

OTHER PUBLICATIONS

Furlani et al, Analysis of grating light valves with partial surface electrodes, J. Appl. Phys. 83(2), Jan. 15, 1998, pp. 629–634.

*Primary Examiner*—Scott J. Sugarman
*Assistant Examiner*—Suzanne Letendre
*Attorney, Agent, or Firm*—Raymond L. Owens

[57] ABSTRACT

A modulator for modulating an incident beam of light having a wavelength $\lambda$ including a base having a surface; an electrode formed over the surface of the base; a plurality of equally spaced apart deformable elements arranged over the electrode and being disposed parallel to each other and secured at opposite ends of each spaced apart deformable element and suspended above the base and having at least two spaced apart conductive and reflective portions and a central reflective portion electrically insulated from the two spaced apart conductive and reflective portions and disposed therebetween; a reflective layer disposed over the base between the spaced apart deformable elements; and applying a potential between the electrode and the spaced apart conductive and reflective portions so that the spaced apart conductive and reflective portions are movable between first and second positions which are substantially $\lambda/4$ apart.

6 Claims, 7 Drawing Sheets

DIFFRACTIVE LIGHT MODULATOR

FIELD OF THE INVENTION

This invention relates to an apparatus for modulating a beam of light. More particularly, this invention describes a substantially flat reflective surface having selectively deformable elements for providing a diffraction grating.

BACKGROUND OF THE INVENTION

Advances in micromachining technology have given rise to a variety of Micro-electromechanical systems (MEMS) including light modulators for low cost display applications. Such modulators provide high-resolution, high operating speeds (KHz frame rates), multiple gray scale levels, color adaptability, high contrast ratio, and compatibility with VLSI technology. One such modulator has been disclosed in U.S. Pat. No. 5,311,360. This modulator is a micromachined reflective phase grating. It consists of a plurality of equally spaced deformable elements in the form of beams suspended at both ends above a substrate thereby forming a grating. The deformable elements have a metallic layer that serves both as an electrode, and as reflective surface for incident light. The substrate is also reflective and contains a separate electrode. The deformable elements are designed to have a thickness equal to $\lambda/4$ where $\lambda$ is the wavelength of the incident light source. They are supported a distance of $\lambda/4$ above, and parallel to, the substrate. Thus, when the deformable elements are unactivated, i.e., undeflected, the distance between their top surface and the substrate equals $\lambda/2$. Thus when light impinges perpendicularly to the surface of this surface the grating reflects light as a flat mirror. However, when a sufficient voltage (switching voltage) is applied between the deformable elements and the substrate, the resulting electrostatic force pulls a portion of the deformable elements down a distance $\lambda/4$ toward the substrate, thereby reducing the distance between the top this portion of the elements and the substrate to $\lambda/4$. Thus, light reflected from this portion of the deformable elements is out of phase with that from the substrate and a diffraction pattern is formed. Optical systems can intercept the diffracted light with output occurring only when the deformable elements are activated (i.e., pulled down). For display applications, a number of deformable elements are grouped for simultaneous activation thereby defining a pixel, and arrays of such pixels are used to form an image. Furthermore, since gratings are inherently dispersive, this modulator can be used for color displays.

U.S. Pat. No. 5,677,783 by Bloom et al. discloses a modulator which obviate stiction between grating elements and underlying substrate.

One problem with the prior art modulator is that only a portion of the activated deformable elements deflect the desired distance $\lambda/4$, thereby limiting the diffraction efficiency of the modulator.

SUMMARY OF THE INVENTION

It is an object of the present invention to provide a modulator for modulating an incident beam of light by providing a deformable structure which can effectively move the desired $\lambda/4$ distance.

Another object is to provide a modulator in which a greater portion of the deformable elements deflect the desired distance $\lambda/4$ thus rendering a higher diffraction efficiency than prior art modulators.

These object are achieved in a modulator for modulating an incident beam of light having a wavelength $\lambda$ comprising:

a base having a surface;

an electrode formed over the surface of the base;

a plurality of equally spaced apart deformable elements arranged over the electrode and being disposed parallel to each other and secured at opposite ends of each spaced apart deformable element and suspended above the base and having at least two spaced apart conductive and reflective portions and a central reflective portion electrically insulated from the two spaced apart conductive and reflective portions and disposed therebetween;

a reflective layer disposed over the base between the spaced apart deformable elements; and means for applying potential between the electrode and the spaced apart conductive and reflective portions so that the spaced apart conductive and reflective portions are movable between first and second positions which are substantially $\lambda/4$ apart.

An advantage of the light modulator of the invention is that a greater portion of the deformable elements deflect the desired distance $\lambda/4$ thus rendering a higher diffraction efficiency than prior art modulators

DETAILED DESCRIPTION OF THE PREFERRED EMBODIMENTS

Figure 1:
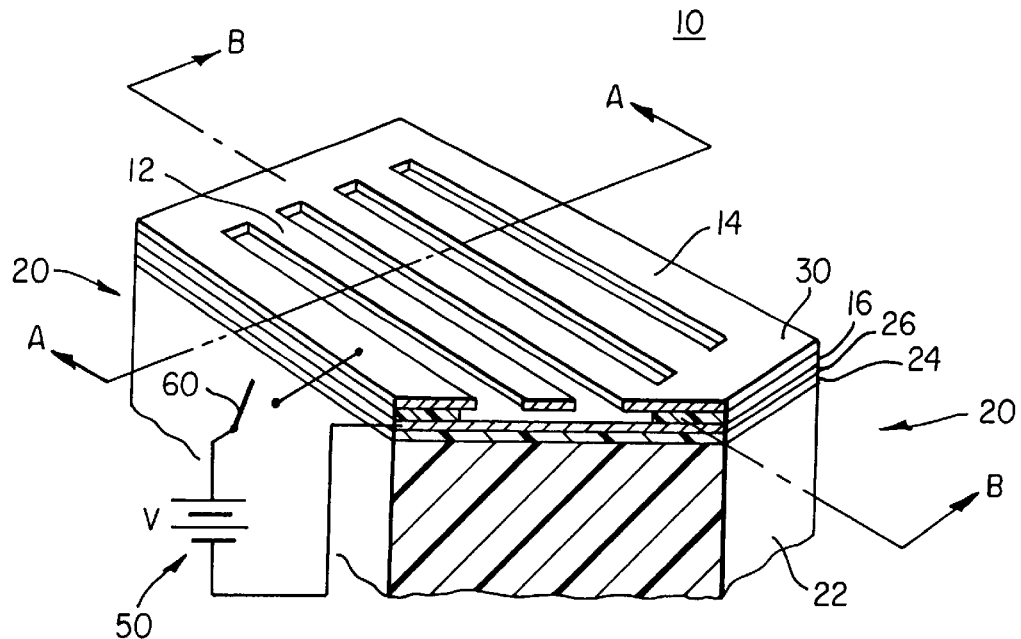
FIG. 1 is a perspective, partially cut-away view of a prior art modulator.
Figure 2:
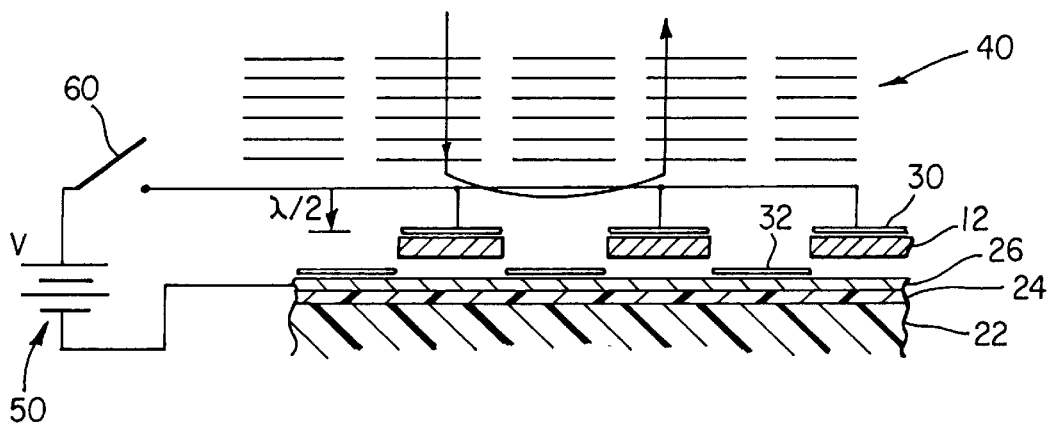
FIG. 2 is sectional view of the prior art modulator of FIG. 1 taken along line A—A of FIG. 1 wherein the deformable elements are in the up position.
Figure 3:
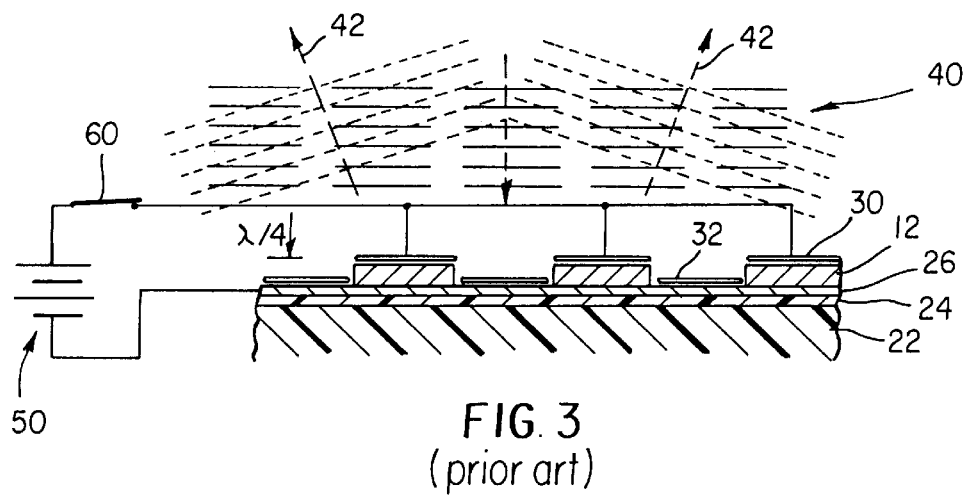
FIG. 3 is sectional view of the prior art modulator of FIG. 1 taken along line A—A of FIG. 1 wherein the deformable elements are in the down position.

Referring to FIGS. 1, 2, and 3 perspective, partially cut-away and sectional views of a prior art light modulator 10 are shown. The light modulator 10 comprises a plurality of equally spaced deformable elements 12 in the form of beams which are supported at both ends and integrally formed with a frame 14. The frame 14 is fixedly attached to a spacer layer 16 which, in turn, is fixedly attached to, and supported by, a base 20. The base 20 comprises a substrate 22, a passivating layer 24 which is formed over the substrate, and a conducting layer 26 which is formed over the passivating layer 24 as shown. A thin layer 30 of light reflective and conductive material such as aluminum is deposited on the top of the deformable elements 12 and on the frame 14 as shown. A thin layer 32 of light reflective and conductive material such as aluminum is deposited and on the base 20 between the deformable elements 12. A power source 50 is electrically connected via a switch 60 to the conductive layers 30 and 26 thereby permitting the application of a voltage or potential between the layers 30 and 26 when the switch 60 is closed. The light modulator 10 is designed so that the height difference between the top of the deformable elements 12 when they are unactivated (i.e., in an up position), and the base 20 is equal to $\lambda/2$ where $\lambda$ is the wavelength of the incident light. Furthermore, the deformable elements 12 have a thickness equal to $\lambda/4$ as shown.

In FIG. 2 the prior art modulator 10 is shown in a sectional view taken along line A—A in FIG. 1. Specifically, three deformable elements 12 are shown. The prior art modulator 10 is shown with switch 60 open so that there is no voltage applied between the conductive layer 30 on the deformable elements 12 and the conductive layer 26 on the base 20. When no voltage is applied, the deformable elements 12 are flat due to the inherent residual tensile stress therein. Thus when a light wave 40 of wavelength $\lambda$ impinges perpendicularly to the surface of the modulator 10, the light reflected from the layer 30 on the deformable elements 12 is in phase with the light reflected from the layer 32 on the base 20 between the deformable elements 12 and therefore the modulator 10 reflects light as a flat mirror.

In FIG. 3 the prior art modulator 10 is shown in a sectional view taken along line A—A in FIG. 1. Again, three deformable elements 12 are shown. The switch 60 is closed and the power source 60 imposes a voltage V between the conductive layer 30 on the deformable elements 12 and the conductive layer 26 on the base 20, as shown. The applied voltage gives rise to an electrostatic force between the deformable elements 12 and the base 20, and the voltage is sufficiently high enough to bend the deformable elements 12 downward until the midportion of the deformable elements 12 deflects a distance $\lambda/4$ downward as shown (see FIG. 5). It is important to note that only a portion of the deformable elements 12 deflect in this manner because they are fixedly attached to the frame 14 at their endpoints. The voltage sufficient to activate the deformable elements 12 in this fashion is called the switching voltage. Thus when a lightwave 40 of wavelength $\lambda$ impinges perpendicularly to the surface of the modulator 10, the light reflected from the layer 30 on the deformable elements 12 is in out of phase with the light reflected from the layer 32 on the base 20 between the deformable elements 12 and the modulator 10 diffracts the incident light in directions indicated by arrows 42. Optical systems can be designed to intercept the diffracted light with output occurring only when the deformable elements 12 are activated. For display applications, a group of deformable elements 12 can be simultaneously activated to form a pixel, and arrays of such pixels can be fabricated for displaying and image.

Figure 4:
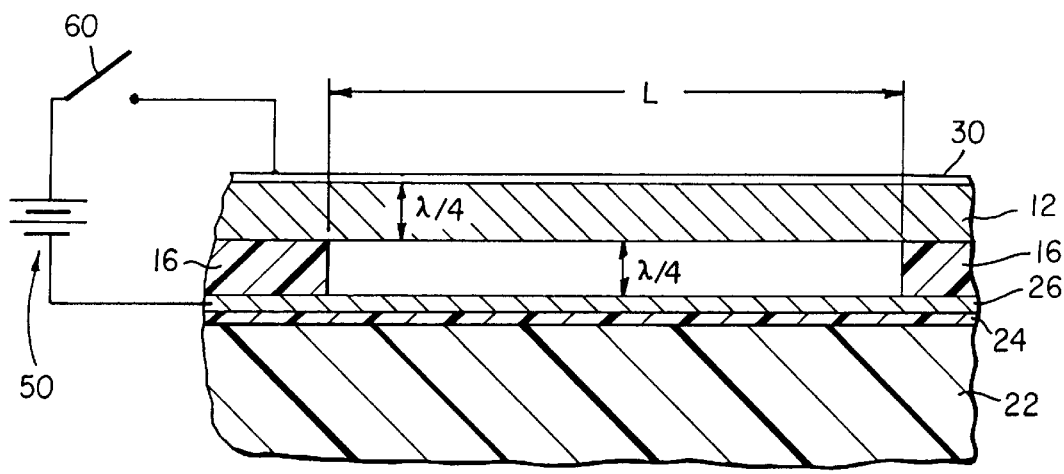
FIG. 4 is sectional view of the prior art modulator of FIG. 1 taken along line B—B of FIG. 1 wherein the deformable elements are in the up position.

Referring to FIG. 4, a sectional view is shown of the modulator 10 taken along line B—B of FIG. 1, wherein the deformable elements 12 are in an unactivated up position (i.e., the switch 60 is open and there is no voltage applied between the conductive layer 30 on the deformable elements 12 and the conducting layer 26 of the base 20).

Figure 5:
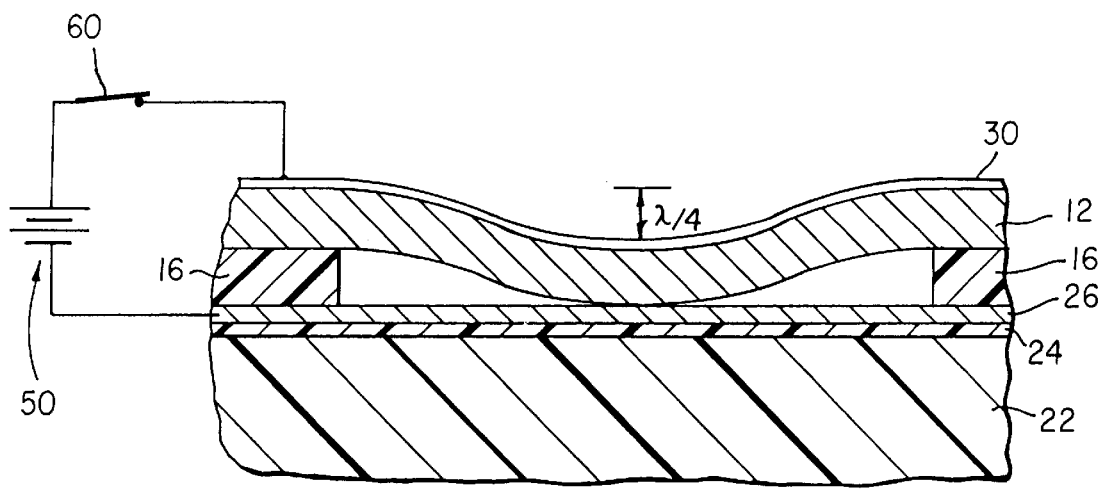
FIG. 5 is sectional view of the prior art modulator of FIG. 1 taken along line B—B of FIG. 1 wherein the deformable elements are in the down position.

Referring to FIG. 5, a sectional view is shown of the modulator 10 taken along line B—B of FIG. 1, wherein the deformable elements 12 are in an activated down position, i.e., the switch 60 is closed and the power source 60 imposes a voltage V between the conductive layer 30 on the deformable elements 12 and the conductive layer 26 on the base 20. It is important to note that the activated deformable elements 12 obtain the desired $\lambda/4$ deflection over a limited portion of their midsection as shown. Moreover, the diffraction efficiency and hence the efficiency of the modulator 10 is proportional to the portion of deformable elements 12 that obtain the desired $\lambda/4$ deflection upon activation. A key feature of the present invention is an increase in the portion of deformable elements 12 that obtain the desired $\lambda/4$ deflection upon activation as will be described.

Figure 6:
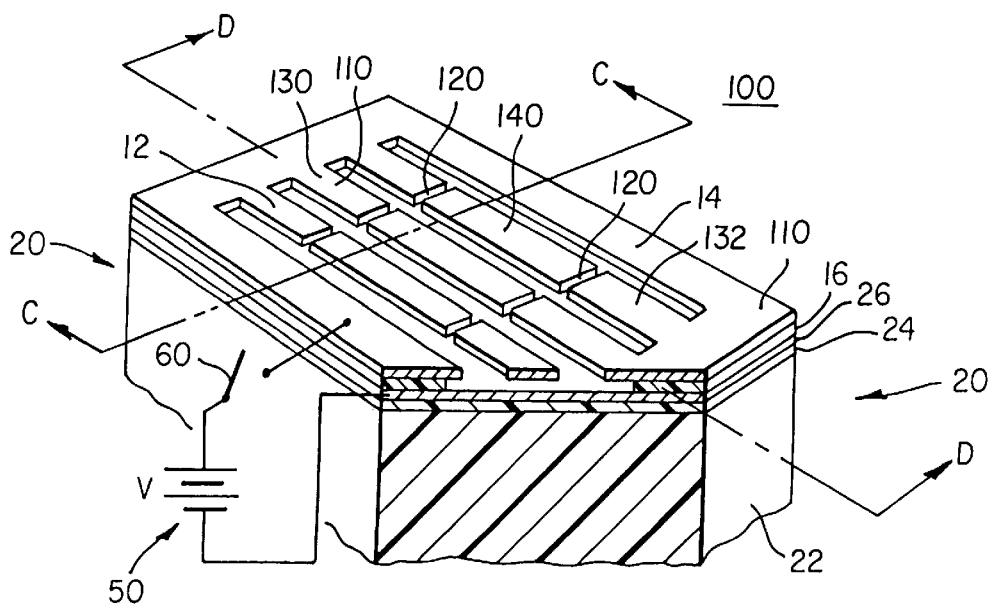
FIG. 6 is a perspective, partially cut-away view of a modulator in accordance with the invention.
Figure 7:
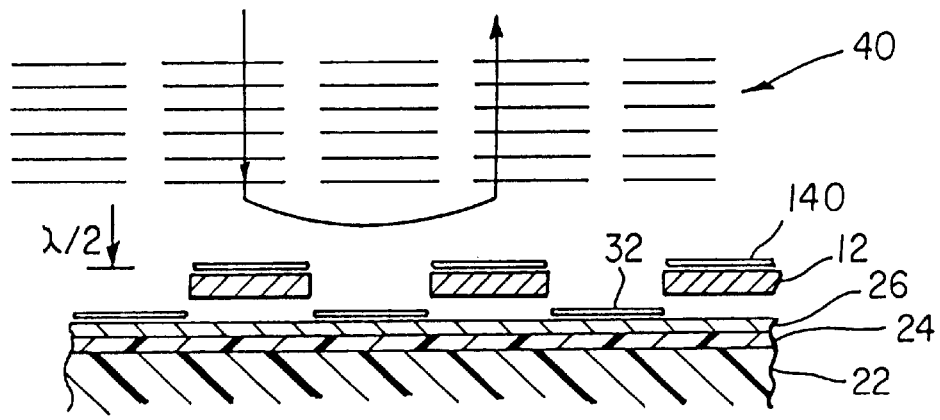
FIG. 7 is sectional view of the prior art modulator of FIG. 6 taken along line C—C of FIG. 6 wherein the deformable elements are in the up position.
Figure 8:
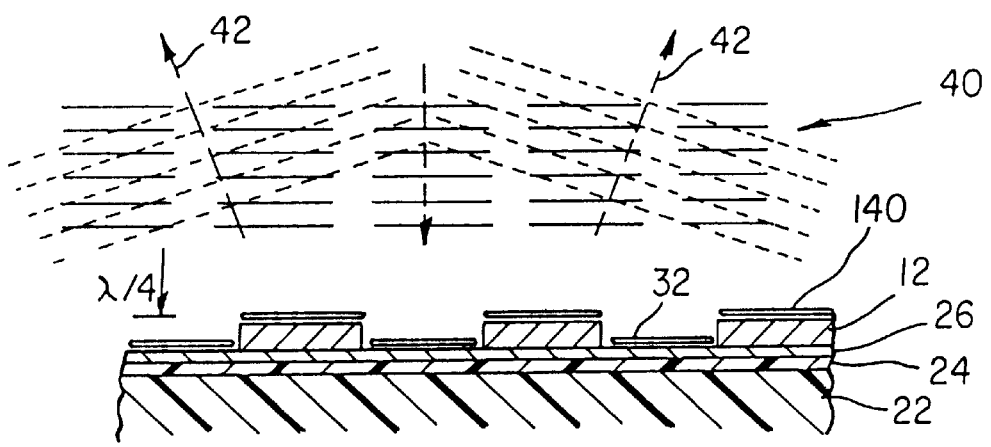
FIG. 8 is sectional view of the prior art modulator of FIG. 6 taken along line C—C of FIG. 6 wherein the deformable elements are in the down position.

Referring to FIGS. 6, 7 and 8, the light modulator 100 of the invention is shown in perspective, partially cut-away, and sectional views. The light modulator 100 comprises a plurality of equally spaced deformable elements 12 in the form of beams which are supported at both ends and are integrally formed with a frame 14. The deformable elements are preferable made from silicon nitride. The frame 14 is fixedly attached to a spacer layer 16 which, in turn, is fixedly attached to, and supported by, a base 20. The base 20 comprises a substrate 22, preferably silicon, a passivating layer 24, preferably silicon nitride, which is formed over the substrate, and a conductive layer 26, preferably tungsten or tungsten alloy, which is formed over the passivating layer 24 as shown. A thin layer 110 of light reflective and conductive material such as aluminum is deposited on the top of the deformable elements 12 and on the frame 14 as shown. A thin layer 32 of light reflective and conductive material, preferably aluminum, is deposited on the base 20 between the deformable elements 12. A power source 50 is electrically connected via a switch 60 to the conductive layers 110 and 26 thereby permitting the application of a voltage or potential between the layers 110 and 26 when the switch 60 is closed. The thin layer 110 of light reflective conductive material has grooves 120 in it through its thickness down to the deformable element 12. The grooves 120 provide an electrical separation of the end portions 130 and 132 of layer 110 from its central portion 140. It is instructive to note that the central portion 140 must be reflective but not necessarily conductive, and therefore it need not be a portion of layer 110. Instead, it could be a different separate layer deposited on the central portion of the deformable elements 12 and electrically isolated from the conductive end portions 130 and 132 of layer 110. The light modulator 100 is designed so that the height difference between the top of the deformable elements 12 in an unactivated state, and the base 20 is equal to $\lambda/2$ where $\lambda$ is the wavelength of the incident light.

In FIGS. 7 and 8, sectional views taken along line C—C of FIG. 6 are shown of the modulator 100 in an unactivated and activated state, respectively. Three deformable elements 12 are shown. In FIG. 7, the modulator 100 is shown with no voltage applied between the conductive layers 130, 132 on the deformable elements 12 and the conductive layer 26 of the base 20. When no voltage is applied, the deformable elements 12 are flat due to the inherent residual tensile stress therein. Thus when a lightwave 40 of wavelength $\lambda$ impinges perpendicularly to the surface of the modulator 100, the light reflected from the layers 130, 132 and 140 on the deformable elements 12 is in phase with the light reflected from the layer 32 on the base 20 between the deformable elements 12 and therefore the modulator 100 reflects light as a flat mirror.

Figure 9:
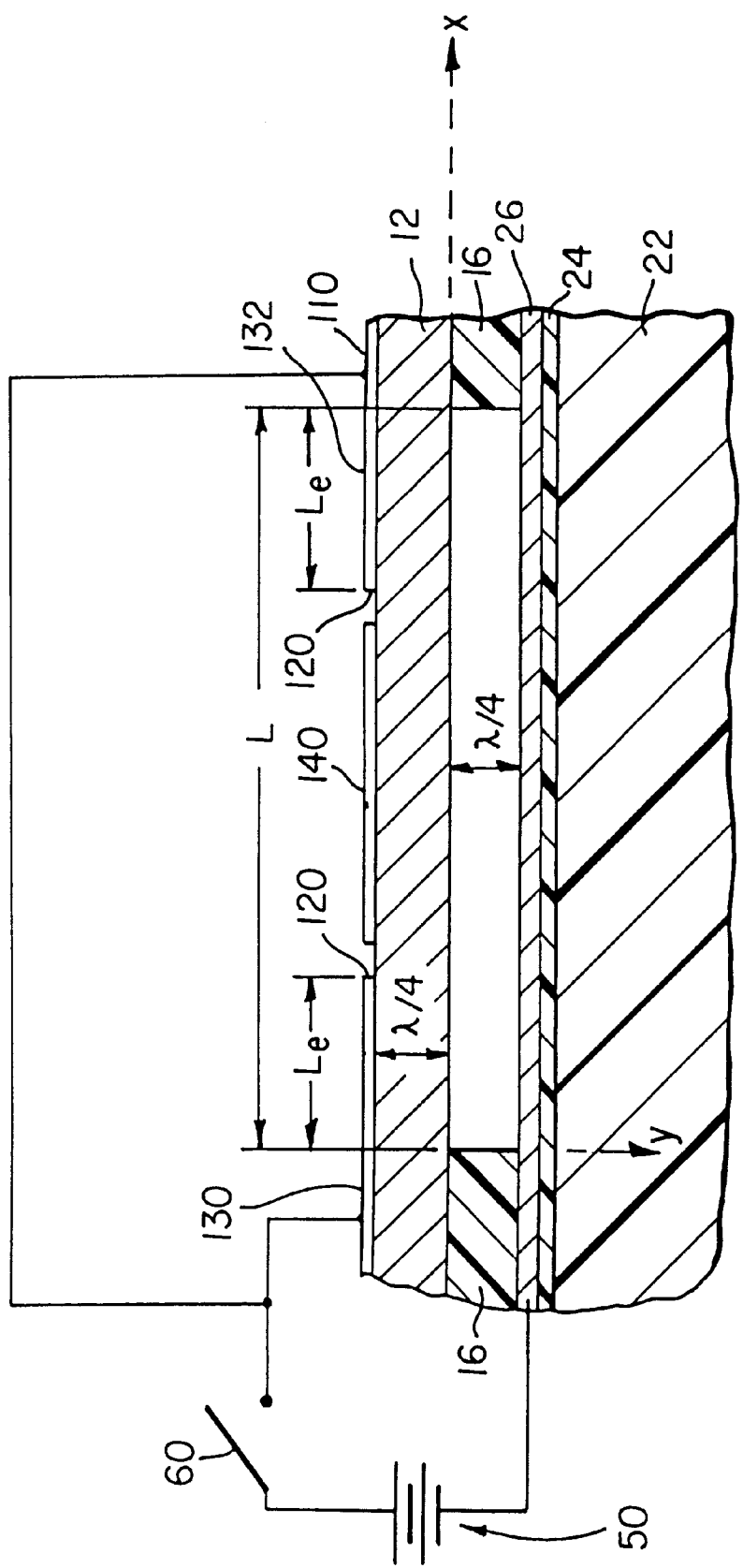
FIG. 9 is sectional view of the prior art modulator of FIG. 6 taken along line D—D of FIG. 6 wherein the deformable elements are in the up position.

In FIG. 9 the modulator 100 is shown with a voltage applied between the applied between the conductive layers 130, 132 on the deformable elements 12 and the conducting layer 26 of the base 20, i.e., the switch 60 is closed and the power source 50 imposes a voltage V between the conductive layers 130, 132 on the deformable elements 12 and the conductive layer 26 on the base 20. The applied voltage V gives rise to an electrostatic force between the base 20 and the end portions of the deformable elements 12 covered by conductive layers 130 and 132. When the voltage is sufficiently high, the deformable elements 12 bend downward until at least a portion of the deformable element 12 deflects a distance $\lambda/4$ downward. The voltage sufficient to activate the deformable elements 12 in this fashion is called the switching voltage. Thus when a lightwave 40 of wavelength $\lambda$ impinges perpendicularly to the surface of the modulator 100 the light reflected from the layers 130, 132 and 140 on the portion of the deformable elements 12 that is deflected a distance $\lambda/4$ downward is out of phase with the light reflected from the layer 32 on the base 20 between the deformable elements 12, and the modulator 100 diffracts the incident light in directions indicated by arrows 42. As described above, optical systems can be designed to intercept the diffracted light with output occurring only when deformable elements 12 are activated.

Referring to FIG. 9, a sectional view is shown of the modulator 100 taken along line D—D of FIG. 6, wherein the deformable elements 12 are in an unactivated up position, i.e., the switch 60 is open. The modulator 100 is shown with conductive end portions 130 and 132 electrically isolated from the reflective central portion 140. The length of the deformable elements 12 between their supported ends is denoted L, and the lengths of the conductive end portions 130 and 132 are taken to be equal, and are denoted Le, although it will be appreciated that the respective lengths of the conductive end portions 130 and 132 need not be equal. A coordinate system is assigned to the deformable element 12 with the variable y denoting the position of the lower edge of the deformable elements 12 and the variable x denoting the position along the length of the deformable elements 12 starting from the left end support of deformable elements 12. It is instructive to note that the grooves 120 electrically separate the conductive end portions 130 and 132 from the conductive central portion 140 of conductive reflective layer 110 on deformable elements 12.

Figure 10:
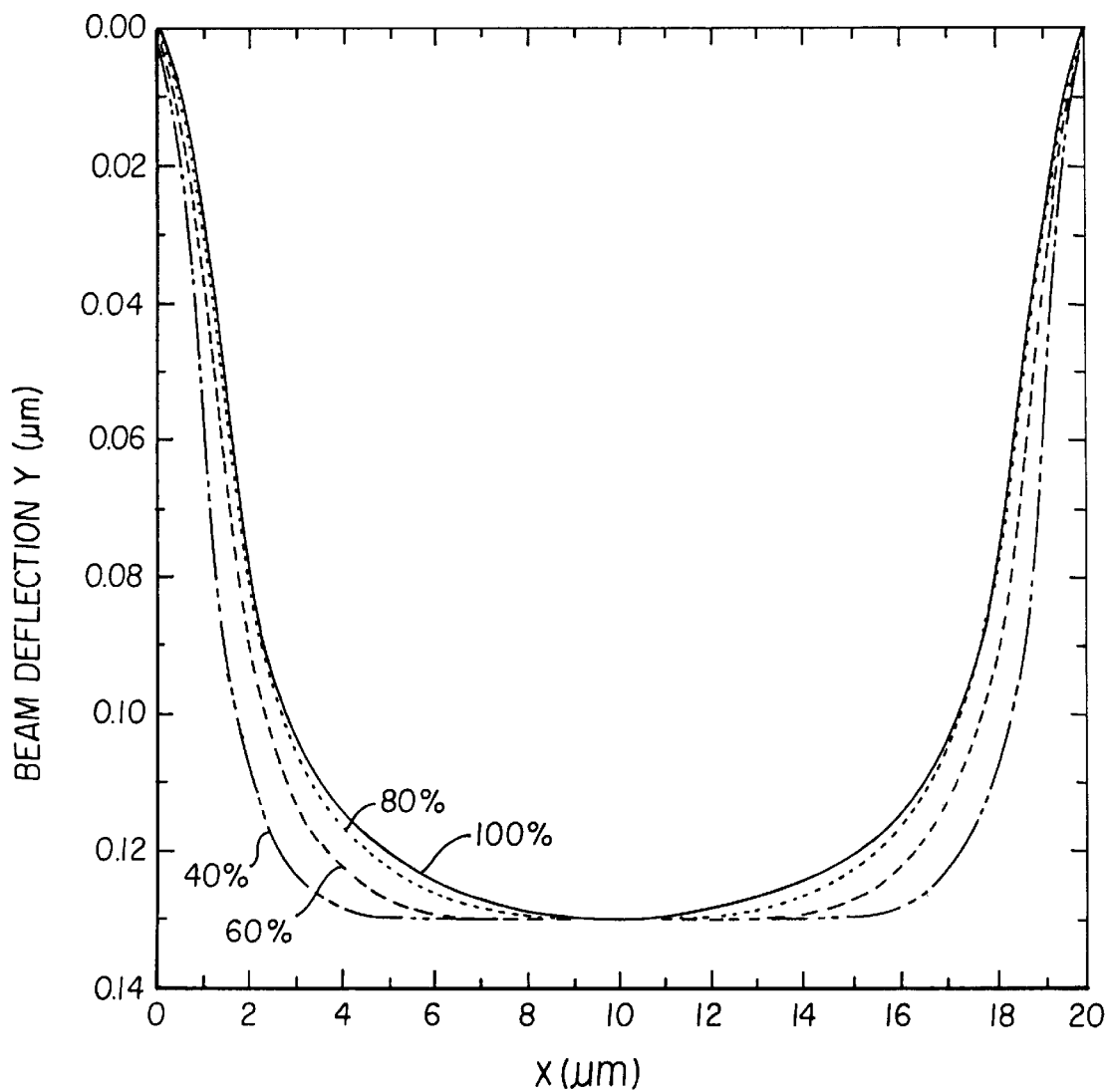
FIG. 10 depicts plots of the deflection profiles of activated deformable elements of the modulator of the invention for different lengths of conductive end portions of the deformable elements.

Referring to FIG. 10, theoretical plots are shown of the deflection profiles of activated deformable elements 12 of the modulator 100 for different lengths Le of conductive end portions 130 and 132 of conductive reflective layer 110 on deformable elements 12. A complete description of these plots can be found in Furlani et al, "Analysis of grating light valves with partial surface electrodes", J. Appl. Phys., 83(2), January, 1998, pgs. 629–634. The deflection profiles are shown in terms of the deflection y of the lower edge of the deformable elements 12 versus the distance x which runs along the length of the deformable element 12 as shown in FIG. 9. Specifically, the ratio $R=(2Le)/L \times 100$ specifies the percentage of the length of deformable elements 12 covered by the conductive end portions 130 and 132 of conductive reflective layer 110 on deformable elements 12. For the purposes of the analysis, it is assumed that the deformable elements 12 have a tensile stress T=400 MPa, a length L=20 microns, and a relative dielectric permittivity of 6.45. Deflection profiles were computed for four different values of R=40, 60, 80, and 100%. It is important to note that as percentage of the length of deformable elements 12 covered by the conductive end portions 130 and 132 of conductive reflective layer 110 on deformable elements 12 decreases, the deflection profile of the activated deformable elements 12 becomes flatter thereby increasing the diffraction efficiency of the modulator 100.

Figure 11:
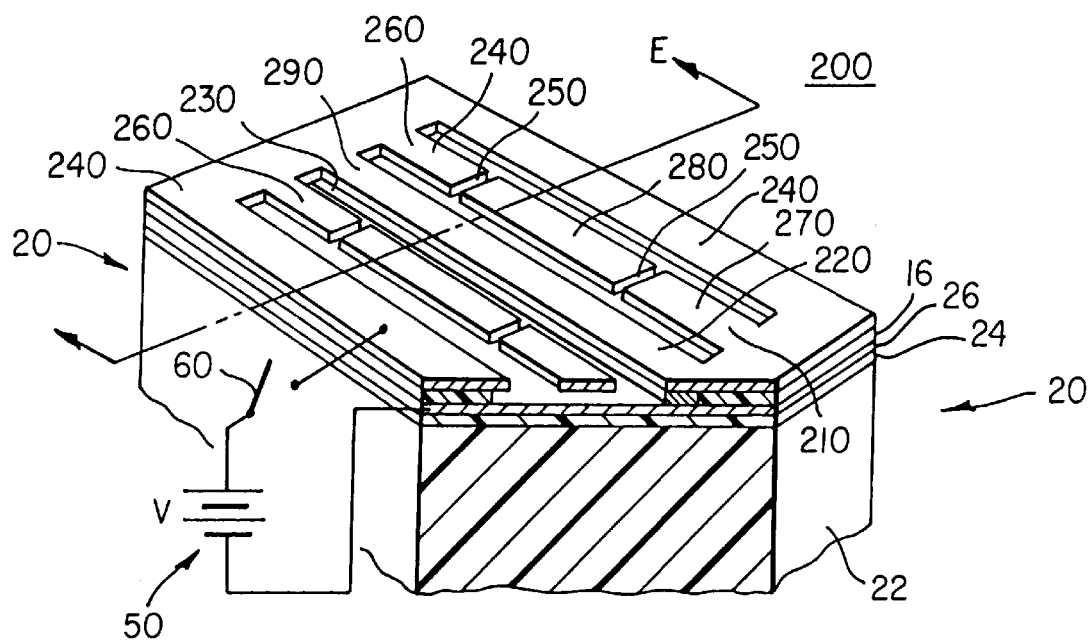
FIG. 11 is a perspective, partially cut-away view of an alternate embodiment of the modulator of the invention.
Figure 12:
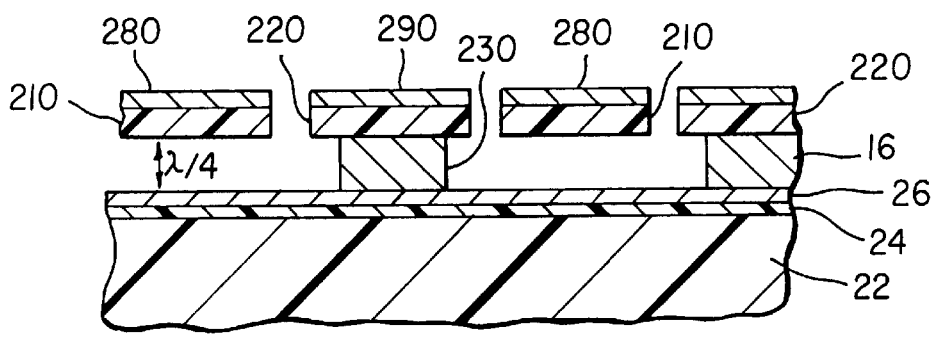
FIG. 12 is sectional view of the modulator of FIG. 11 taken along line E—E of FIG. 11 wherein the deformable elements are in the up position.

Referring to FIGS. 11 and 12, perspective, partially cutaway and sectional views of an alternate embodiment of a modulator 200 of the invention are shown, respectively. The light modulator 200 comprises a first plurality of deformable elements 210 in the form of beams which are integral formed with a frame 14. The thickness of the deformable elements 210 are designed to be $\lambda/4$. The frame 14 is fixedly attached to a spacer layer 16 which, in turn, is fixedly attached to, and supported by, a base 20. The first plurality of deformable elements 210 are suspended by their respective ends over the base 20. The distance from the bottom of the deformable element 210 and the base is designed to be $\lambda/4$ as shown in FIG. 12. A second plurality of fixed elements 220 are fixedly attached to the frame 14, and are mounted to the base 20 via rigid support members 230. The thickness of the elements 220 and the height of the support members 230 are both preferably designed to be $\lambda/4$. The base 20 comprises a substrate 22, a passivating layer 24 which is formed over the substrate, and a conducting layer 26 which is formed over the passivating layer 24 as shown. A thin layer of conductive and reflective material 240 is deposited on the top of the first plurality deformable elements 210, and the frame 14. The layer 240 of reflective conductive material has grooves 250 etched in it through its thickness down to the deformable element 210. The grooves 250 provide electrical separation of the conductive end portions 260 and 270 of layer 240 from its conductive central portion 280. It is instructive to note that the central portion 280 must be reflective but not necessarily conductive, and therefore it need not be a portion of layer 240. Instead, it could be a different separate layer deposited on the central portion of the deformable elements 12 and electrically isolated from the conductive end portions 260 and 270 of layer 240. A power source 50 is electrically connected via a switch 60 to the conductive layers 240 and 26 thereby permitting the application of a voltage or potential between the layers 240 and 26 when the switch 60 is closed. A thin layer of reflective material 290, preferably aluminum, is deposited on the top of the second plurality of fixed elements 220. The light modulator 200 is designed so that the height difference between the tops of the first plurality of deformable elements 210 and the base 20 is preferably equal to $\lambda/2$.

Referring to FIG. 12 a sectional view of the modulator 200 is shown taken along line E—E of FIG. 11. When no voltage is applied between the conductive layers 260 and 270 on the first plurality of deformable elements 210 and the conductive layer 26 of the base 20 the first plurality of deformable elements 210 are flat due to the inherent residual tensile stress therein. Thus when a light wave of wavelength $\lambda$ impinges perpendicularly to the surface of the modulator 200, the light reflected from the reflective layers 260, 270 and 280 on the first plurality of deformable elements 210 is in phase with the light reflected from the reflective layer 290 on the second plurality of fixed elements 220 and the modulator 200 reflects light as a flat mirror.

When the switching voltage is applied between the conductive layers 260 and 270 on the first plurality of deformable elements 210 and the conductive layer 26 of the base 20, i.e., when switch 60 is closed, the first plurality of deformable elements 210 bend downward so that a portion of their midportion is deflected a distance $\lambda/4$ downward (not shown). Thus when a light wave of wavelength λ impinges perpendicularly to the surface of the modulator 200, the light reflected from the reflective layers 260, 270 and 280 on the first plurality of deformable elements 210 is out of phase with the light reflected from the reflective layer 290 on the second plurality of fixed elements 220 and the modulator 200 diffracts light as described above. Optical systems can be designed to intercept the diffracted light with output occurring only when the first plurality of deformable elements 210 are activated.

The invention has been described in detail with particular reference to certain preferred embodiments thereof, but it will be understood that variations and modifications can be effected within the spirit and scope of the invention.

Parts List
10 prior art light modulator
12 deformable element
14 frame
16 spacer layer
20 base
22 substrate
24 passivating layer
26 conducting layer
30 conductive reflective layer
32 conductive reflective layer
40 light wave
42 arrows
50 power source
60 switch
100 light modulator of the invention
110 conductive reflective layer
120 grooves
130 conductive reflective end portion
132 conductive reflective end portion
140 conductive reflective central portion
200 alternate embodiment of light modulator
210 first plurality of deformable elements
220 second plurality of fixed elements
230 rigid support members
240 conductive reflective layer of material
250 grooves
260 end portions of layer 240
280 midportion of layer 240
290 conductive reflective layer of material

We claim:

1. A modulator for modulating an incident beam of light having a wavelength λ comprising:

a base having a surface, a passivating layer formed over the surface and an electrode formed over the passivating layer;

a plurality of equally spaced apart deformable elements arranged over the electrode and being disposed parallel to each other and secured at opposite ends of each spaced apart deformable element and suspended above the base and having at least two spaced apart conductive and reflective portions and a central reflective portion positioned between the two spaced apart conductive and reflective portions and electrically insulated from the two spaced apart conductive and reflective portions and disposed therebetween;

a reflective layer disposed over the base between the spaced apart deformable elements; and means for applying potential between the electrode and the spaced apart conductive and reflective portions so that the spaced apart conductive and reflective portions are movable between first and second positions which are substantially λ/4 apart.

2. The modulator of claim 1 wherein the electrode is formed by doping the surface of the base with a conductive material.

3. The modulator of claim 1 wherein the conductive and reflective portion is selected from the group consisting of aluminum, copper, gold, silver, and alloys thereof.

4. A modulator for modulating an incident beam of light having a wavelength λ comprising:

a base having a surface, a passivating layer formed over the surface and an electrode formed over the passivating layer;

a first plurality of deformable elements and a first plurality of reflective fixed elements fixedly attached to the base and being disposed parallel to each other and the first plurality of deformable elements being secured at opposite ends of each deformable element and suspended above the base and having at least two spaced apart conductive and reflective portions and a central reflective portion positioned between the two spaced apart conductive and reflective portions and electrically insulated from the two spaced apart conductive and reflective portions and disposed therebetween; and means for applying potential between the electrode and the spaced apart conductive and reflective portions so that the spaced apart conductive and reflective portions are movable between first and second positions which are substantially λ/4 apart.

5. The modulator of claim 4 wherein the electrode is formed by doping the surface of the base with a conductive material.

6. The modulator of claim 4 wherein the conductive and reflective portion is selected from the group consisting of aluminum, copper, gold, silver, and alloys thereof.

* * * * *